United States Patent [19]

Elterman

[11] Patent Number: 4,735,497
[45] Date of Patent: Apr. 5, 1988

[54] APPARATUS FOR VIEWING PRINTED CIRCUIT BOARDS HAVING SPECULAR NON-PLANAR TOPOGRAPHY

[75] Inventor: Paul B. Elterman, Cambridge, Mass.

[73] Assignee: AOI Systems, Inc., Lowell, Mass.

[21] Appl. No.: 510,053

[22] Filed: Jul. 1, 1983

[51] Int. Cl.⁴ .......................... G02B 21/06; G02B 5/08
[52] U.S. Cl. ...................................... 350/523; 350/601
[58] Field of Search ............... 350/523, 141, 319, 291; 356/236

[56] References Cited

U.S. PATENT DOCUMENTS 3,604,783  9/1971  Roth .............................. 350/319 X
3,941,467  3/1976  Kopany et al. .................. 350/291 X
4,402,604  9/1983  Nash ................................... 356/237

FOREIGN PATENT DOCUMENTS 0898007  6/1962  United Kingdom ................ 350/291

Primary Examiner—John K. Corbin
Assistant Examiner—Vincent J. Lemmo
Attorney, Agent, or Firm—Robert M. Asher

[57] ABSTRACT

An isotropic light source produces uniform illumination of a generally planar objects to be visually inspected by a microscope such as a P.C. board having an irregular specular surface. Detrimental dark spots which are normally produced are eliminated by providing a skewed beamsplitter between the microscope and the viewed surface, which beamsplitter redirects light directly at the object along or near the optical viewing axis. The isotropic light source is a light integrating cavity in a first embodiment and a pair of fluorescent lamps in a second embodiment.

30 Claims, 3 Drawing Sheets

APPARATUS FOR VIEWING PRINTED CIRCUIT BOARDS HAVING SPECULAR NON-PLANAR TOPOGRAPHY

BACKGROUND OF THE INVENTION

The present invention relates to the field of optically inspecting objects such as printed circuit boards or the like.

In performing optical inspection of P.C. boards, integrated circuits, photomasks or other similar objects, it is often necessary to form high contrast images of the surface patterns of such objects. Under high magnification, "flat" plated conductors, for example, will have portions which are not really flat, and the conductor side edges will not be absolutely at right angles with respect to the "flat" top surfaces of the plated conductors. These edge portions often resemble irregularly sloping surfaces which are to be visually observed. Since the metallic conductors reflect light at least somewhat specularly, and have the aforesaid surface irregularities, these surfaces may be described as non-planar or curved surfaces, having irregular specular topography, although the surfaces are often "flat" in a general sense. In order to obtain images of uniform intensity of a surface with facetted or curved topography, the surface is illuminated with an isotropic light source, i.e., the surface is illuminated uniformly at all angles which may be accomplished by a light integrating cavity for providing a large number of reflections therein.

However, it is observed that certain portions of the object thus illuminated will still appear dark, which is undesirable since information regarding the object's configuration, for example, is thereby lost. Such dark spots will be seen by placing a magnifier over an illuminated P.C. board having metallic conductors thereon. This interesting phenomenon may also be observed by photographing an illuminated mirror "head on" to produce a dark spot at the optical axis. An observer looking at a mirror, however, will not see the spot due to the darkness of the iris and pupil of the eye. In FIG. 1 of this specification, a microscope is employed to view a portion of a P.C. board which is illuminated by an off-axis light source. A simplified schematic representation (in cross section) of the plated conductor 1 is illuminated and light ray 2 will be redirected by the right-hand portion of the conductor and will be visible to the observer employing the microscope to view the P.C. board "head on." However, the flat horizontal portion 3 of the conductor causes light ray 4 to rebound as indicated, so that the observer sees a dark spot. Sloping portion 6 of conductor 1 will also not be seen by the observer since the surface is blocked from the light source by the conductor. If the aforesaid light integrating cavity is positioned about the P.C. board, remote portion 6 would then be illuminated and thus be made visible to the observer. However, since virtually all of the reflected light which emanates from the cavity walls would strike the flat portion 3 at an angle with respect to optical axis 5, the dark spot will still remain as such reflected light would not enter the microscope. Thus, the provision of a light diffusing cavity surrounding the P.C. board having specular patterns thereon of an irregular topography would still produce dark spots. If the microscope used to view the printed circuit board is positioned off-axis, such as in a position occupied by the lamp in FIG. 1 of this specification, the remote slope 6 would not be viewed by the observer through the microscope. See FIG. 2A of U.S. Pat. No. 3,398,634 with respect to this point. It is thus a principal object of the present invention to provide an optical illumination apparatus for viewing all irregular portions of specular objects and yet eliminate the aforesaid dark spot problem produced by portions perpendicular to the optical viewing axis.

In U.S. Pat. No. 4,144,556, an object is placed within an oval shaped shell having a light diffusing inner surface for reducing glare. In U.S. Pat. No. 4,236,781 a light diffusion plate is positioned between a light source and an object to be viewed by an off-axis camera, and in U.S. Pat. No. 3,737,226 a pair of pyramidal shaped diffuser members are employed to cause light to strike the subject being viewed at numerous angles. In U.S. Pat. No. 4,220,982 light passes through a cylindrical diffuser before striking a set of parabolic reflectors. This arrangement also includes a semi-reflecting mirror to block most direct light from striking the object being viewed. None of these references are directed to the solution of the above-stated problem which is the primary object of my invention.

SUMMARY OF THE INVENTION

In accordance with one embodiment of the present invention, an object being viewed having a specular, irregular nonplanar topography is surrounded by a light integrating cavity having inner diffusely reflecting light surfaces of high reflectivity, which are illuminated by a diffuse light source. A microscope, camera or other viewing device is positioned along an optical viewing axis perpendicular to the general plane of the object and a beamsplitter is positioned between the microscope and the object, the planar surface thereof being skewed with respect to the optical axis to a sufficient extent to cause light reflected from at least one wall portion of the cavity facing the beamsplitter to be re-reflected by the surface of the beamsplitter so as to be projected perpendicular to the general plane of the object along the optical viewing axis. In accordance with a second embodiment, a pair of elongated fluorescent lamps directly illuminate a portion of the object. As a result, the aforementioned dark spot problem is eliminated and no object information is lost.

Other objects, features and advantages of the present invention will become apparent upon the study of the following description taken in conjunction with the drawings in which.

SPECIFIC DESCRIPTION

Figure 1:
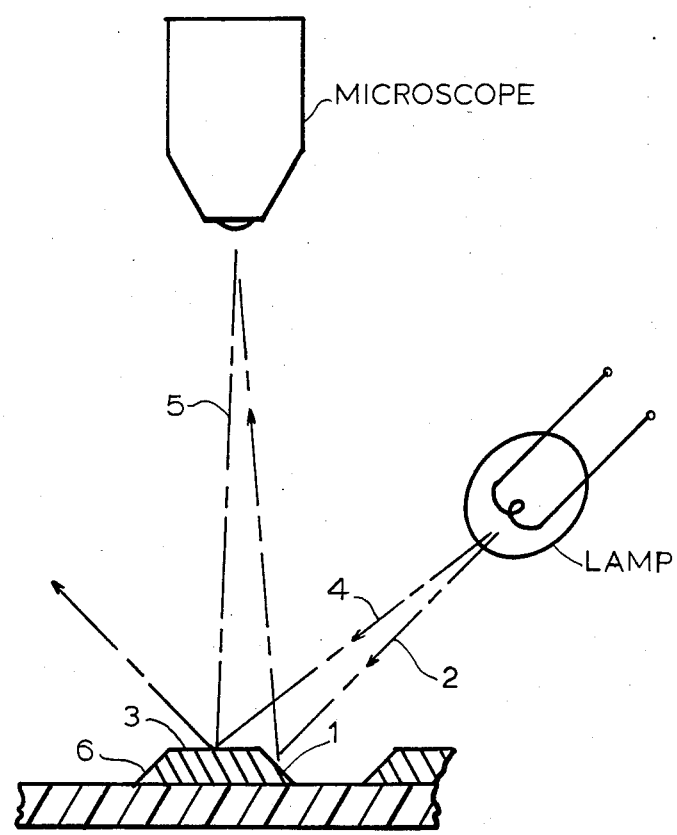
FIG. 1 illustrates a prior art approach mentioned above.
Figure 2:
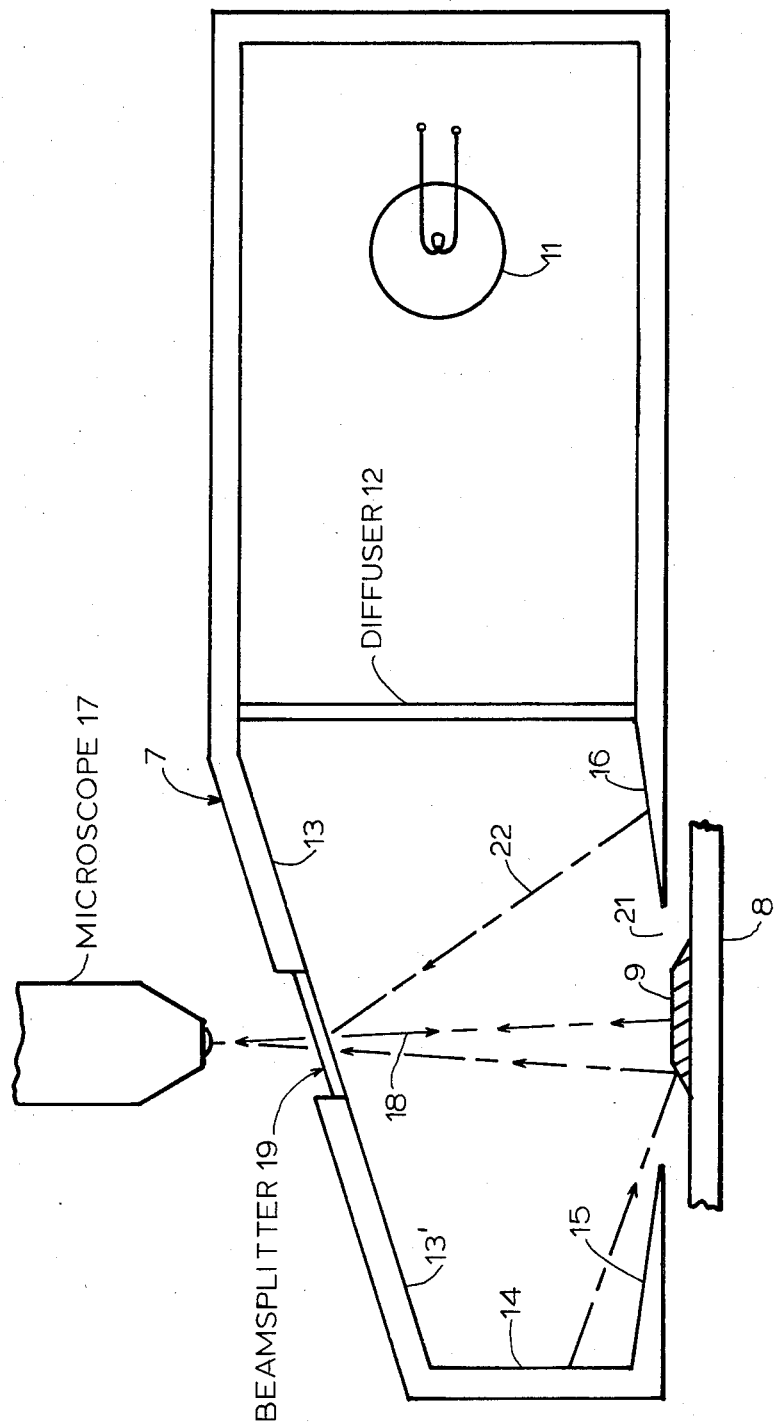
FIG. 2 illustrates a first embodiment of the present invention.

In FIG. 2 a light integrating cavity 7, functioning as an isotropic light producing means, is provided for illuminating P.C. board 8 having conductive portion 9 positioned thereon. Light source 11 produces light which passes through light diffuser 12 and which strikes interior wall portions 13, 13', 14, 15 and 16 of the light integrating cavity which are preferably coated with a flat white paint. Microscope 17 is positioned along optical viewing axis 18 and a skewed beamsplitter 19 is positioned as indicated, such beamsplitter preferably having a light transmission factor of about 10%. Thus, light reflected, for example, by wall portion 16, striking the surface of beamsplitter 19, will be re-reflected along optical axis 18 toward the object being viewed in aperture 21 thereby to eliminate the aforesaid dark spot problem.

As light is reflected a number of times within integrating cavity 7, uniform illumination of the object positioned within aperture 21 results, so that all portions of conductor 9 will now be made visible by the observer employing microscope 17. Should beamsplitter 19 be oriented perpendicular to optical axis 18, the dark spot problem would still remain since light rays striking the beamsplitter would be reflected in directions away from optical viewing axis 18.

It is thus an important feature of the present invention to provide for the skewing or tilting of beamsplitter 19 with respect to optical axis 18 as shown. As a result, light being re-reflected by reflecting wall portion 16 which faces the beamsplitter, will be re-reflected by the beamsplitter in directions substantially parallel to optical axis 18, thereby to illuminate the upper flat portion of conductor 9. Ray 22, for example, causes light to be redirected along optical axis 18 to eliminate the production of a dark spot due to the presence of flat upper portion of conductor 9.

In summary, the diffusely reflecting inside walls of the light integrating cavity provides illumination from all directions to illuminate all object surfaces, while the dark spot problem is eliminated by providing a skewed beamsplitter coacting with the integrating cavity 9 as indicated.

Figure 3:
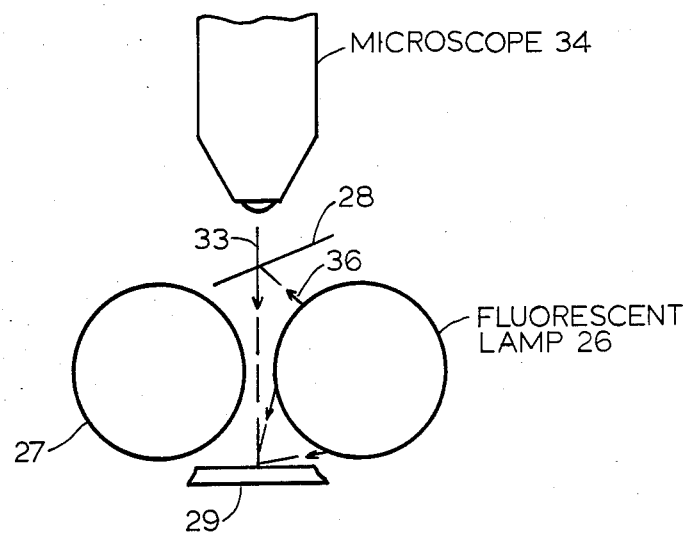
FIGS. 3 and 4 illustrate a second embodiment of the present invention.
Figure 4:
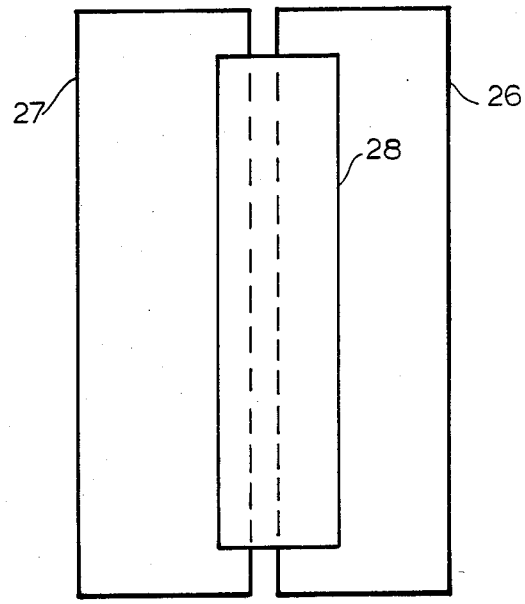

A second embodiment of the present invention which is sometimes preferred depending upon application is illustrated in FIGS. 3 and 4. FIG. 3 illustrates fluorescent lamps 26 and 27 which are positioned between beamsplitter 28 and object 29. Viewing axis 33 extends from microscope 34 toward the beamsplitter 28, between fluorescent lamps 26 and 27 and bisects the field of view formed by the lamps. Because the diameters of the fluorescent lamps are large relative to the field of view, this arrangement functions as an isotropic light source with respect to the portion of object 29 being viewed. As a result of this arrangement, light rays generated at the surface of lamp 26 will be reflected off of the lower surface of beamsplitter 28 and will be directed along the optical axis thereby to eliminate the aforesaid dark spot problem. Since the angle of reflection is equal to the angle of incidence it may be observed that light ray 36 will be redirected along the optical axis. Through the use of a mirror, satisfactory results may be obtainable by employing only one lamp rather than two as shown. Due to the fall-off characteristics of light generated at terminal portions of the fluorescent lamps, the length of the field of view should be somewhat less than the length of the lamps. In order to view the entire topography of object 29 relative motion, of course, will be produced between object 29 and the light illumination device described above. In the embodiment constructed by the inventor the bottoms of the fluorescent lamps were positioned about 1/16th of an inch above the surface to be viewed. The length of the field of view was about 24 inches; the fluorescent lamps had a diameter of 1.5 inches and a length of 36 inches, such lamps being separated by a distance of about 0.25 inches. The beamsplitter preferably reflects about 80–90% of the light incident thereon and should be skewed to a sufficient extent to provide desired illumination of the object by light rays projected downwardly along the viewing axis. The term specular surface as used herein is not to be restricted to a highly polished mirror surface, but includes surfaces which possess reflective characteristics and intermediate surface characteristics that are diffuse and specular, e.g., the surface of a polished automobile. The term viewing device is intended to cover a microscope, optical camera, T.V. camera, image dissector, magnifier, photodetector array or the like.

While the above-described embodiments of the invention are preferred, other configurations will be readily apparent to those skilled in the art and thus the invention is only to be limited in scope by the language of the following claims and equivalents.

I claim:

1. Optical apparatus for viewing an object having an irregular specular topography comprising:
   a. an isotropic light producing means for illuminating said object;
   b. a viewing device positioned along an optical viewing axis for viewing at least a portion of said object; and
   c. a beamsplitter positioned between said viewing device and said object and being skewed to a sufficient extent with respect to said optical axis for causing a portion of the light produced by said isotropic light source to be redirected at said object along said optical axis.

2. The combination as set forth in claim 1 wherein said beamsplitter reflects about 90% of light incident thereon.

3. The combination as set forth in claim 2 wherein said optical viewing axis is perpendicular to said object being viewed.

4. The combination as set forth in claim 1 wherein said optical viewing axis is perpendicular to said object being viewed.

5. Optical apparatus for viewing an object having an irregular specular topography comprising:
   a. a light integrating means having diffusely reflecting surfaces of high reflectivity positioned about at least a portion of said object;
   b. a viewing device positioned along an optical viewing axis for viewing at least a portion of said object; and
   c. a beamsplitter positioned between said viewing device and said object and being skewed to a sufficient extent with respect to said optical axis for causing light reflected by at least one surface of said light integrating means to be redirected at said object along said optical axis.

6. The combination as set forth in claim 5 wherein some of the surfaces of said light integrating means are positioned on both sides of said object and face said beamsplitter.

7. The combination as set forth in claim 6 wherein said beamsplitter reflects about 90% of light incident thereon.

8. The combination as set forth in claim 5 wherein said beamsplitter reflects about 90% of light incident thereon.

9. The combination as set forth in claim 6 wherein said light integrating means contains a diffuse light source.

10. The combination as set forth in claim 8 wherein said light integrating means contains a diffuse light source.

11. The combination as set forth in claim 5 wherein said light integrating means contains a diffuse light source.

12. Optical apparatus for viewing an object having an irregular specular topography comprising:
 a. a light integrating cavity having diffusely reflecting surfaces of high reflectivity positioned about at least a portion of said object;
 b. a microscope positioned along an optical viewing axis perpendicular to said object; and
 c. a beamsplitter positioned between said microscope and said object, the planar surface thereof being skewed to a sufficient extent with respect to said optical axis for causing light reflected by at least one surface of said light integrating cavity to be redirected at said object along said optical axis.

13. The combination as set forth in claim 12 wherein some of the surfaces of said cavity are positioned on both sides of said object and face said beamsplitter.

14. The combination as set forth in claim 13 wherein said beamsplitter reflects about 80-90% of light incident thereon.

15. The combination as set forth in claim 14 wherein said cavity contains a diffuse light source.

16. The combination as set forth in claim 13 wherein said cavity contains a diffuse light source.

17. The combination as set forth in claim 2 wherein said beamsplitter reflects about 90% of light incident thereon.

18. The combination as set forth in claim 12 wherein said cavity contains a diffuse light source.

19. Optical apparatus for viewing an object having an irregular specular topography comprising:
 a. an isotropic light source comprising at least one lamp for illuminating said object;
 b. a viewing device positioned along an optical viewing axis for viewing at least a portion of said object; and
 c. a beamsplitter positioned between said viewing device and said object and being skewed to a sufficient extent with respect to said optical axis for causing a portion of the light produced by said isotropic light source to be redirected at said object along said optical axis.

20. The combination as set forth in claim 19 wherein said isotropic light source includes a pair of lamps positioned on opposite sides of said optical axis.

21. The combination as set forth in claim 20 wherein said pair of lamps are elongated fluorescent lamps.

22. The combination as set forth in claim 21 wherein said lamps are separated from each other to form a narrow field of view with respect to said object.

23. The combination as set forth in claim 21 wherein the size of said elongated lamps are large relative to the width of said narrow field of view.

24. The combination as set forth in claim 21 wherein said isotropic light source is positioned adjacent said object and between said beamsplitter and said object.

25. The combination as set forth in claim 20 wherein said lamps are separated from each other to form a narrow field of view with respect to said object.

26. The combination as set forth in claim 25 wherein said isotropic light source is positioned adjacent said object and between said beamsplitter and said object.

27. The combination as set forth in claim 25 wherein the size of said elongated lamps are large relative to the width of said narrow field of view.

28. The combination as set forth in claim 20 wherein the size of said elongated lamps are large relative to the width of said narrow field of view.

29. The combination as set forth in claim 19 wherein said lamp is an elongated fluorescent lamp.

30. The combination as set forth in claim 19 wherein said isotropic light source is positioned adjacent said object and between said beamsplitter and said object.

* * * * *